(12) United States Patent
Chen (10) Patent No.: US 8,083,265 B1
(45) Date of Patent: Dec. 27, 2011

(54) EASILY UNLATCHABLE CAM-LOCK ACTUATING DEVICE FOR USE IN A LOCKING COUPLING ASSEMBLY THAT COUPLES TWO TUBULAR MEMBERS

(76) Inventor: Waterson Chen, Taichung (TW)

(*) Notice: Subject to any disclaimer, the term of this patent is extended or adjusted under 35 U.S.C. 154(b) by 37 days.

(21) Appl. No.: 12/821,542

(22) Filed: Jun. 23, 2010

(51) Int. Cl.
*F16L 35/00* (2006.01)
(52) U.S. Cl. ............... 285/88; 285/85; 285/91; 285/312
(58) Field of Classification Search .......... 285/81, 285/82, 84, 85, 87, 88, 91, 305, 312
See application file for complete search history.

(56) References Cited

U.S. PATENT DOCUMENTS

| | | | | |
|---|---|---|---|---|
| 5,295,717 A | * | 3/1994 | Chen | 285/84 |
| 5,435,604 A | * | 7/1995 | Chen | 285/84 |
| 5,722,697 A | * | 3/1998 | Chen | 285/91 |
| 5,816,623 A | * | 10/1998 | Chang | 285/88 |
| 5,911,445 A | * | 6/1999 | Lee | 285/84 |
| 6,015,168 A | * | 1/2000 | Fahl | 285/81 |
| 6,047,995 A | * | 4/2000 | Kotake | 285/85 |
| 6,053,540 A | * | 4/2000 | Meyer | 285/88 |
| 6,224,113 B1 | * | 5/2001 | Chien | 285/85 |
| 6,364,369 B2 | * | 4/2002 | Bailey | 285/312 |
| 6,371,523 B1 | * | 4/2002 | Chen | 285/84 |
| 6,447,016 B2 | * | 9/2002 | Collier | 285/81 |
| 6,543,812 B1 | * | 4/2003 | Chang | 285/81 |

* cited by examiner

*Primary Examiner* — David E Bochna (57) ABSTRACT

An easily unlatchable cam-lock actuating device for use in a locking coupling assembly that couples two tubular members, includes a cam arm pivotally mounted on a female tubular coupler and extending thereinto for locking a male tubular end of one of the tubular members, a spring-loaded latch bolt movably mounted in the cam arm to engage a cavity of the coupler so as to lock the cam arm at a locking position, and a releasing lever pivotally mounted on the cam arm and coupled to the latch bolt such that, when the releasing lever is turned from a latched position to an unlatched position, the latch bolt is retracted and disengaged from the cavity.

8 Claims, 15 Drawing Sheets

EASILY UNLATCHABLE CAM-LOCK
ACTUATING DEVICE FOR USE IN A
LOCKING COUPLING ASSEMBLY THAT
COUPLES TWO TUBULAR MEMBERS

BACKGROUND OF THE INVENTION

1. Field of the Invention

This invention relates to a locking coupling assembly that couples two tubular members, more particularly to an easily unlatchable cam-lock actuating device for use in a locking coupling assembly which is operable to quickly connect and disconnect two tubular members.

2. Description of the Related Art

Figure 1:
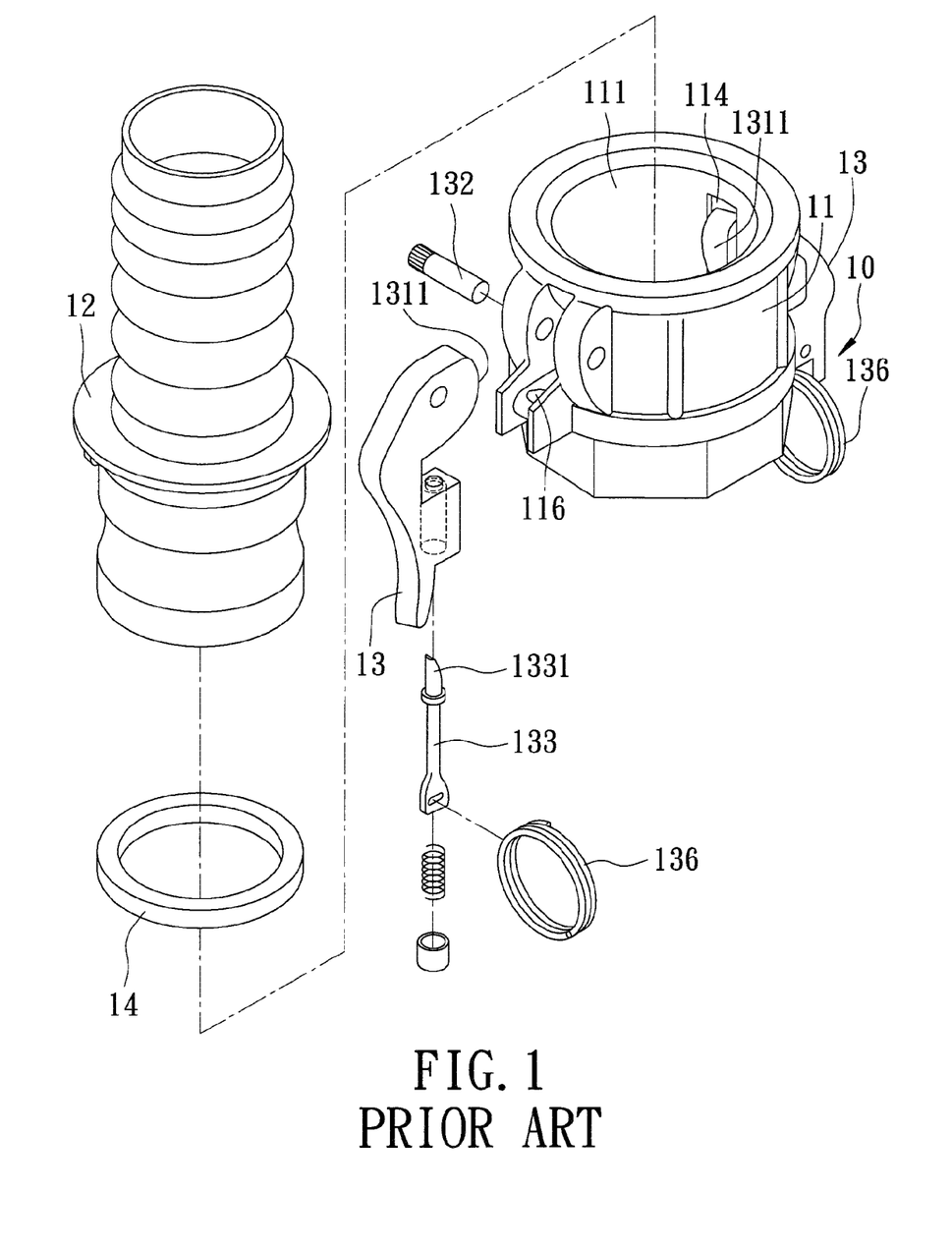
FIG. 1 is an exploded perspective view of conventional locking coupling assembly.

Referring to FIG. 1, a conventional locking coupling assembly 10 disclosed in U.S. Pat. No. 5,435,604 is shown to include a cylindrical body 11 connected to a female coupling tube (not shown), a male coupling tube 12 insertable into the cylindrical body 11, two cam arms 13 pivotably mounted on the cylindrical body 11 by pivot pins 132, and a seal ring 14 mounted on an inner surface of the cylindrical body 11. Each of the cam arms 13 has a cam surface 1311 extending through a slot 114 into a bore 111 in the cylindrical body 11 for engaging the male coupling tube 12 in the bore 111 when the cam arm 13 is at a locking position. A spring-biased lock bolt 133 is movably received in a hole in each of the cam arms 13 such that a locking end 1331 extends through the hole to be inserted into a locking hole 116 in the cylindrical body 11 for retaining the cam arm 13 at the locking position. A pull ring 136 is attached to the lock bolt 133 such that, by pulling the pull ring 136, the locking end 1331 is moved to be disengaged from the locking hole 116 so as to permit turning of the respective cam arm 13 to an unlocking position. Thus, the locking coupling assembly 10 can be used to quickly connect and disconnect two tubular members, such as hoses, pipes, etc.

However, since the pull ring 136 includes a plurality of resilient loops to be hooked on the lock bolt 133, tensile deformation of the loops may occur after numerous times of use. Moreover, gripping and pulling of the pull ring 136 is uncomfortable for the user since the pull ring 136 has a relatively small surface area.

SUMMARY OF THE INVENTION

An object of the present invention is to provide an easily unlatchable cam-lock actuating device for use in a locking coupling assembly, which can be conveniently and comfortably operated to quickly connect and disconnect two tubular members.

According to this invention, the easily unlatchable cam-lock actuating device includes a cam arm, a spring-loaded latch bolt unit, and a releasing lever.

The cam arm has a cam-surfaced head that is disposed to extend into a fitting bore in a female tubular coupler of a locking coupling assembly, and an arm body that is disposed opposite to the cam-surfaced head. The cam arm is pivotally mounted on a lug unit of the female tubular coupler such that, when the arm body is turned to a locking position, the cam-surfaced head is moved to depress a male tubular end of a tubular member to thereby lock the male tubular end in the fitting bore.

The spring-loaded latch bolt unit is disposed on the arm body, and includes a latch bolt and a spring. The latch bolt has a latch end and a latch shank extending from the latch end along a lengthwise line. The latch bolt is movable relative to the arm body along the lengthwise line to permit the latch end to engage a cavity of the female tubular coupler when the arm body is displaced to the locking position, thereby preventing the arm body from moving away from the locking position. The spring is disposed to bias the latch end toward the cavity.

The releasing lever has weight and power ends opposite to each other, and is pivotally mounted on the arm body about a fulcrum axis such that the power end is turnable about the fulcrum axis between a latched position, where the power end is close to the lengthwise line, and an unlatched position, where the power end is remote from the lengthwise line. The weight end is coupled to the latch shank such that, when the power end is turned from the latched position to the unlatched position, the latch end is retracted and disengaged from the cavity against the biasing action of the spring.

Since the latch bolt is moved by operating the releasing lever, the locking and unlocking operations of the locking coupling assembly can be effortlessly and conveniently performed.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Referring to FIGS. 2 to 6, the first preferred embodiment of an easily unlatchable cam-lock actuating device according to the present invention is used in a locking coupling assembly to couple two tubular members (not shown). The locking coupling assembly includes a female tubular coupler 100 which has an inner tubular surface defining a fitting bore 105 for receiving a male tubular end of one of the tubular members, and an outer tubular surface having a radial opening 104 that extends to be communicated with the fitting bore 105, a lug unit 101 which is disposed on the outer tubular surface adjacent to the radial opening 104, and a ledge 102 which is disposed on the outer tubular surface and adjacent to the radial opening 104, and which has a cavity 103. The cam-lock actuating device of this embodiment is shown to comprise a cam arm 20, a spring-loaded latch bolt unit 40, and a releasing lever 30.

The cam arm 20 has a cam-surfaced head 201 that is disposed to extend into the fitting bore 104, and an arm body 202 that is disposed opposite to the cam-surfaced head 201, and is pivotally mounted on the lug unit 101 about a pivot axis 21. Thus, when the arm body 202 is turned to a locking position, the cam-surfaced head 201 is moved to depress the male tubular end of the respective tubular member to thereby lock the male tubular end in the fitting bore 105. The arm body 202 has a receiving bore 22 extending along a lengthwise line, and a pivot portion 23 extending to terminate at a joint surface 231.

Figure 2:
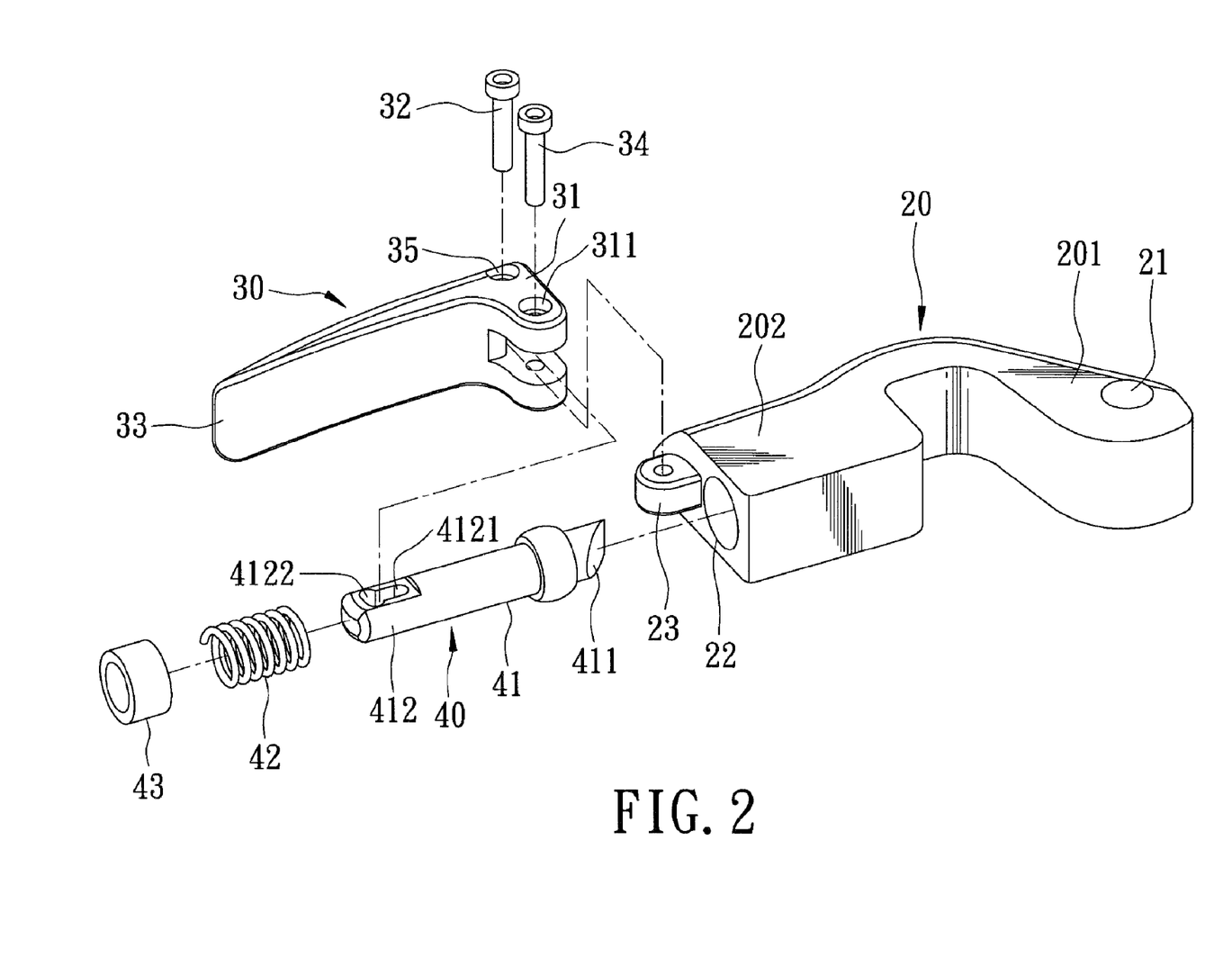
FIG. 2 is an exploded perspective view of the first preferred embodiment of an easily unlatchable cam-lock actuating device according to this invention.
Figure 3:
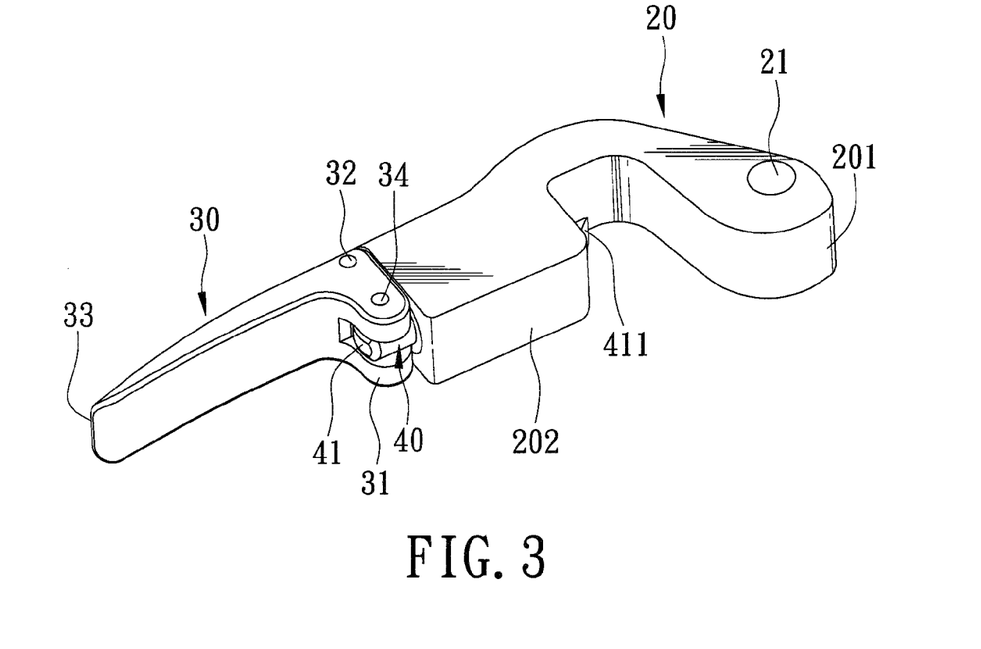
FIG. 3 is a perspective view of the first preferred embodiment.
Figure 4:
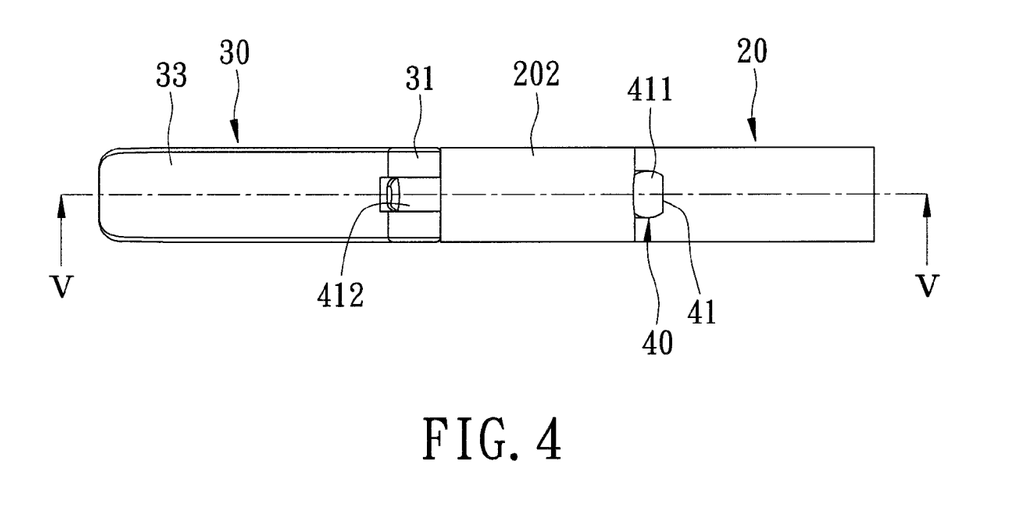
FIG. 4 is a side view of the first preferred embodiment.
Figure 5:
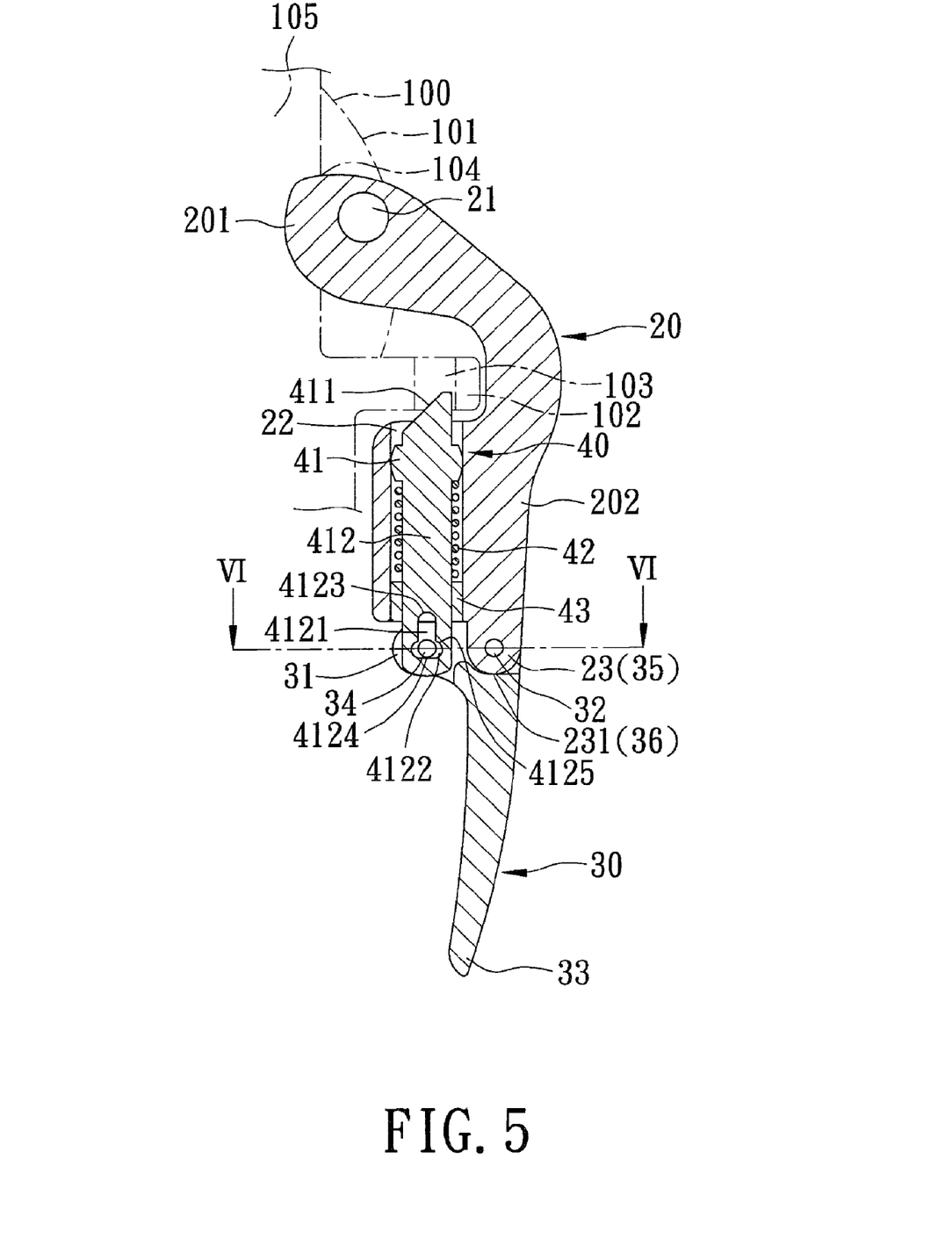
FIG. 5 is a sectional view taken along line V-V of FIG. 4.
Figure 6:
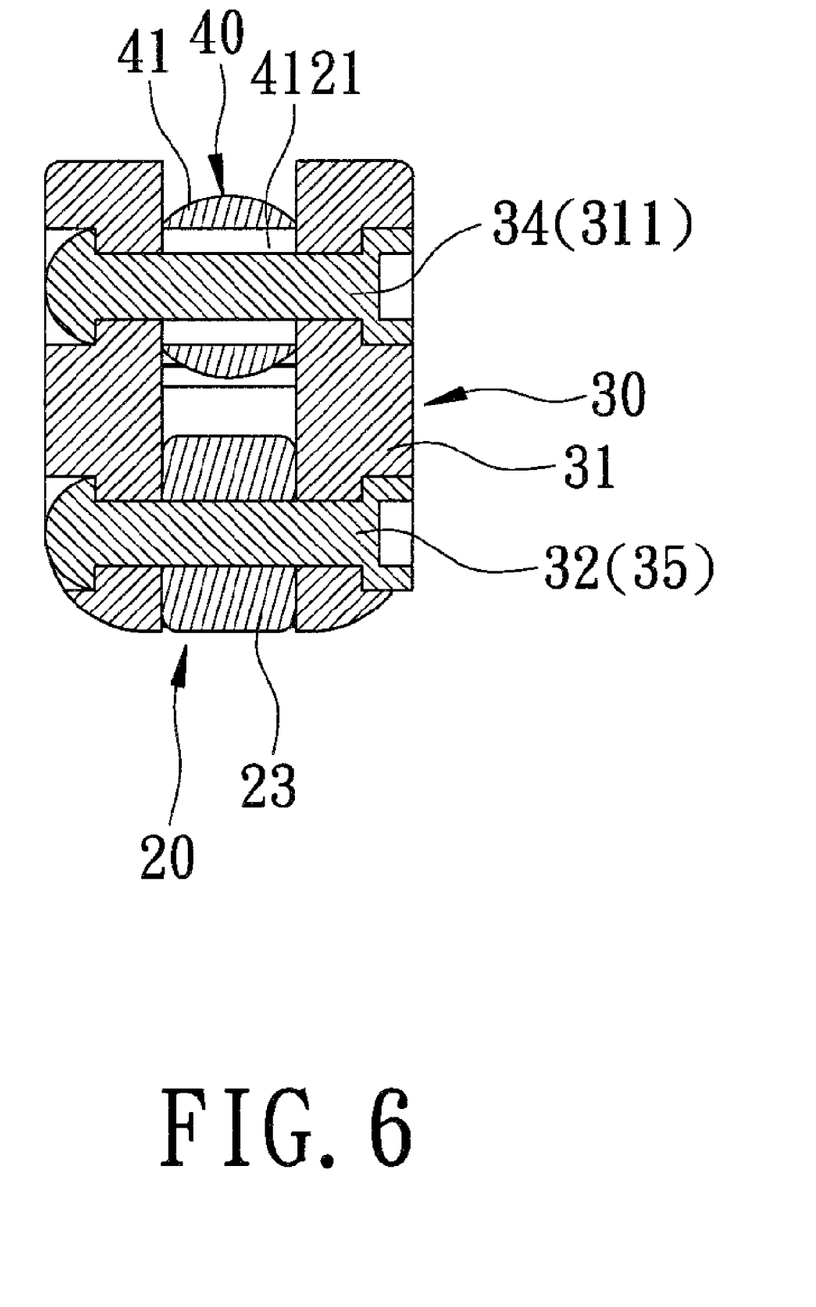
FIG. 6 is a sectional view taken along line VI-VI of FIG. 5.

The spring-loaded latch bolt unit 40 is disposed in the receiving bore 22, and includes a latch bolt 41, a spring 42, and a positioning ring 43. The latch bolt 41 has a latch end 411 and a latch shank 412 extending from the latch end 411 along the lengthwise line, and is movable along the receiving bore 22 to permit the latch end 411 to engage the cavity 103 when the arm body 202 is displaced to the locking position, thereby preventing the arm body 202 from moving away from the locking position. The positioning ring 43 is press-fitted into the receiving bore 22. The spring 42 is disposed to abut against the positioning ring 43 and the latch bolt 41 so as to bias the latch end 411 toward the cavity 103. The latch end 411 has a tapered shape to facilitate engagement with the cavity 103. The latch shank 412 has a slotted keyway 4121 extending along the lengthwise line to terminate at proximate and distal regions 4123,4124 relative to the cavity 103, and a docking port 4122 extending transversely from the distal region 4124 and defined by a docking shoulder 4125.

The releasing lever 30 has weight and power ends 31,33 disposed opposite to each other, and a fulcrum portion 35 pivotally mounted on the lug portion 23 by a pivot pin 32 about a fulcrum axis parallel to the pivot axis 21. Thus, the power end 33 is turnable about the fulcrum axis 32 between a latched position, as shown in FIG. 5, where the power end 33 is close to the lengthwise line, and an unlatched position, as shown in FIG. 7, where the power end 33 is remote from the lengthwise line.

The joint surface 231 is disposed to angularly surround the fulcrum axis 32. A friction wall 36 is disposed on the releasing lever 30 between the fulcrum axis 32 and the power end 33, and is in slidable friction engagement with the joint surface 231. In addition, a key 34 is disposed to extend through a hole 311 in the weight end 31 and is slidable in the slotted keyway 4121. The joint surface 231, the friction wall 36, the docking shoulder 4125, and the key 34 cooperatively serve as a counter-force generating mechanism.

Figure 7:
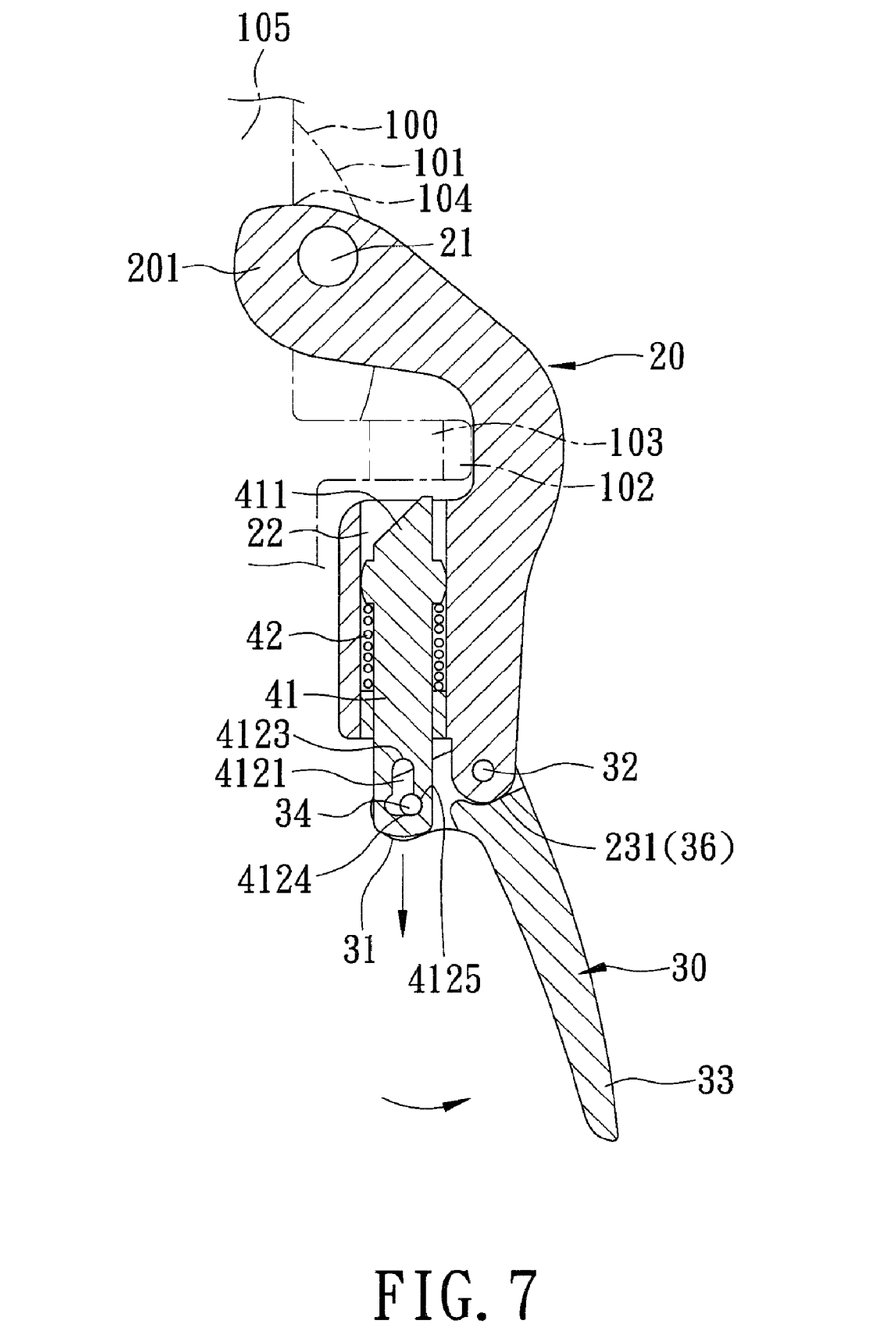
FIG. 7 is a sectional view similar to FIG. 5, illustrating a releasing lever at an unlatched position.

Referring to FIG. 7, when the power end 33 is manually operated to turn from the latched position to the unlatched position, the key 34 is moved from the proximate region 4123 to the distal region 4124 and is subsequently anchored on the docking shoulder 4125, and the latch bolt 41 is moved along the receiving bore 22 against the biasing action of the spring 42 so that the latch end 411 is retracted and disengaged from the cavity 103. By virtue of the frictional engagement between the key 34 and the docking shoulder 4125, and by virtue of the frictional engagement between the joint surface 231 and the friction wall 36, the weight end 31 is vested with a counter-force to counteract the biasing action of the spring 42 so as to retain the power end 33 at the unlatched position, thereby facilitating a user's grip of the cam arm 20 to subsequently perform an unlocking operation of the locking coupling assembly.

Figure 8:
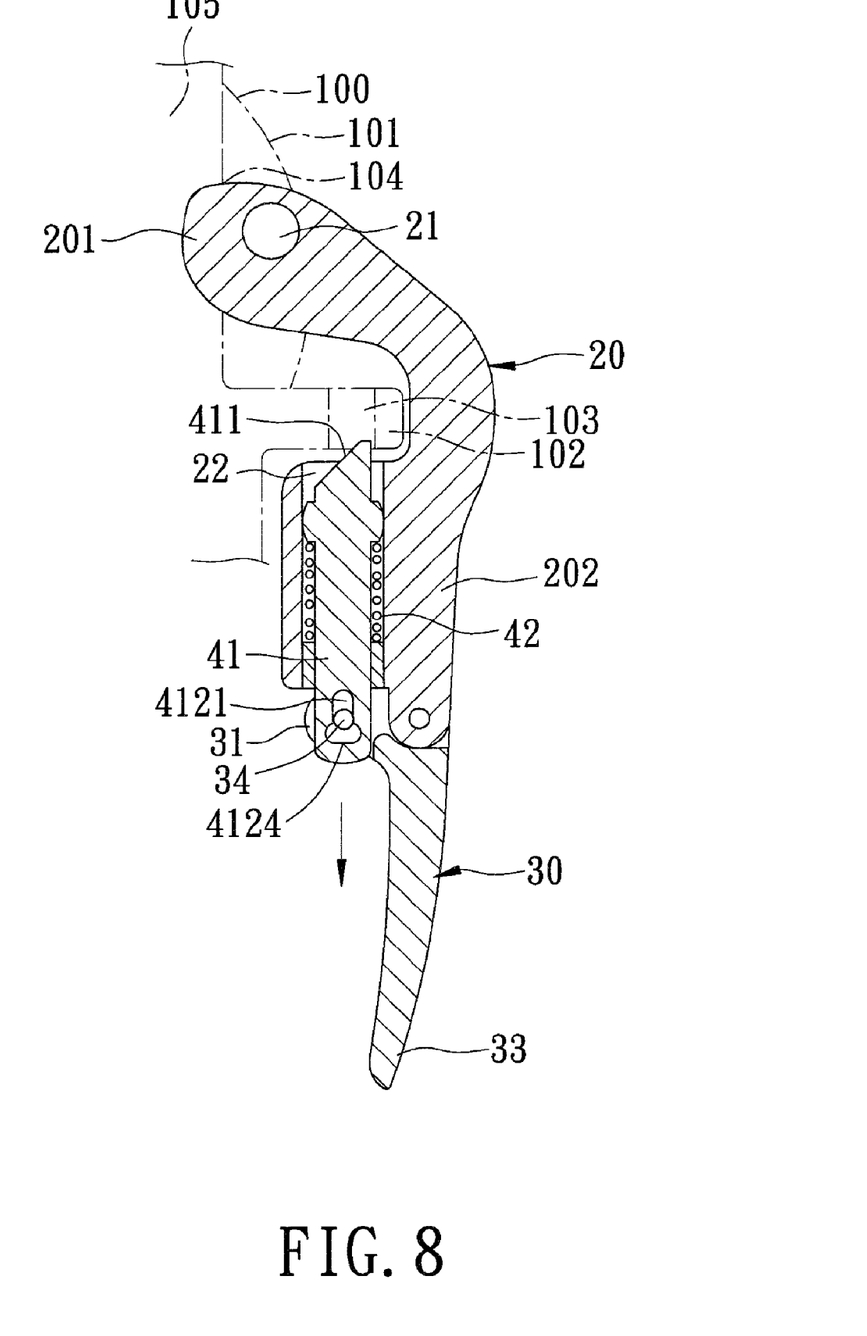
FIG. 8 is a sectional view similar to FIG. 5, illustrating the releasing lever at a latched position.

Referring to FIG. 8, when the arm body 202 is turned to the locking position, and when the power end 33 of the releasing lever 30 is turned to the latched position, the key 34 is moved in the distal region 4124 such that the latch bolt 41 is moved toward the ledge 102 to permit the latch end 411 to be inserted into the cavity 103 by virtue of the biasing action of the spring 42. The tapered configuration of the latch end 411 may facilitate the insertion of the latch end 411 into the cavity 103.

As illustrated, since the latch bolt 41 is moved by operating the releasing lever 30 instead of pulling of a pull ring as in the prior art, the locking and unlocking operations of the locking coupling assembly can be effortlessly and conveniently performed.

Figure 9:
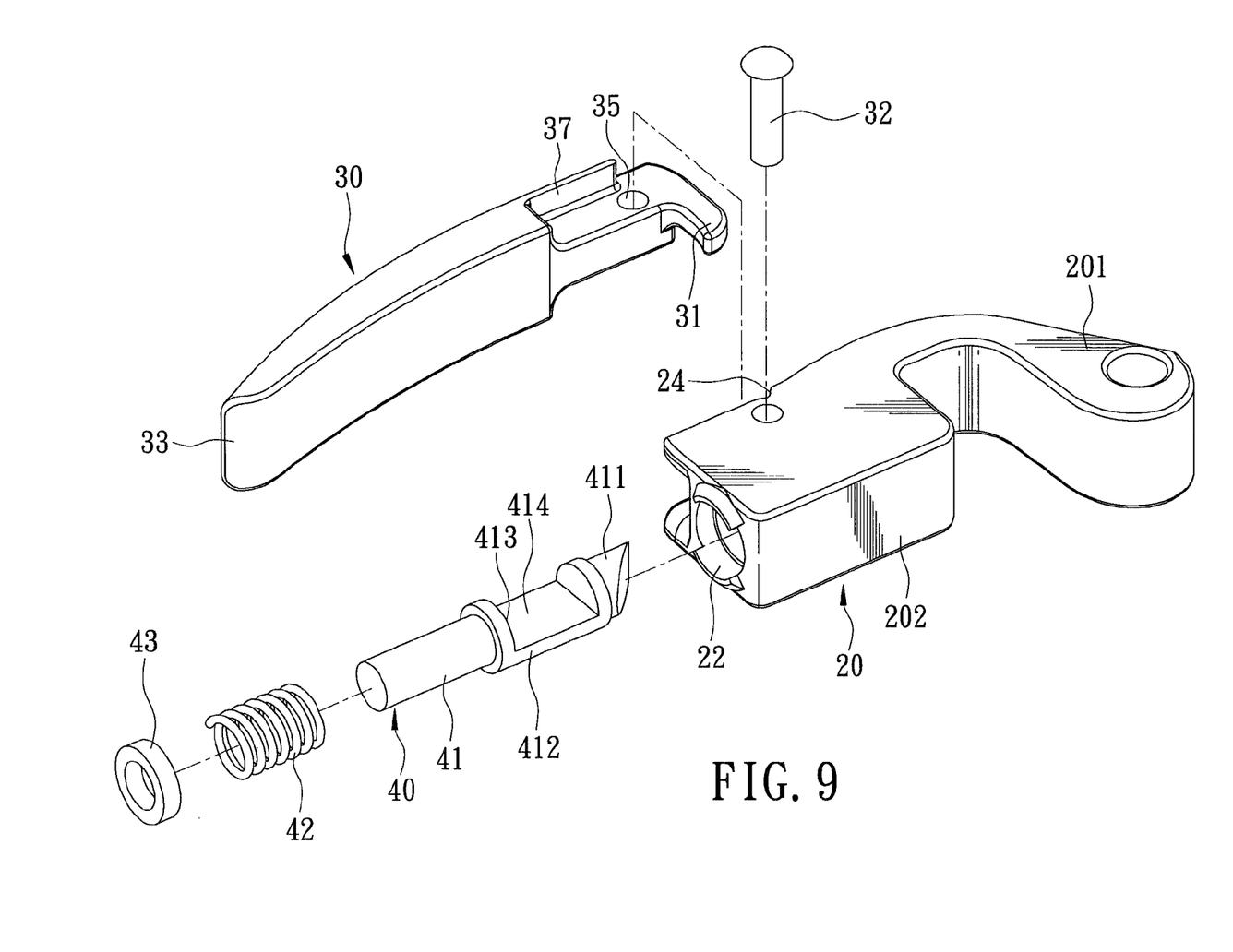
FIG. 9 is an exploded perspective view of the second preferred embodiment of an easily unlatchable cam-lock actuating device according to this invention.
Figure 10:
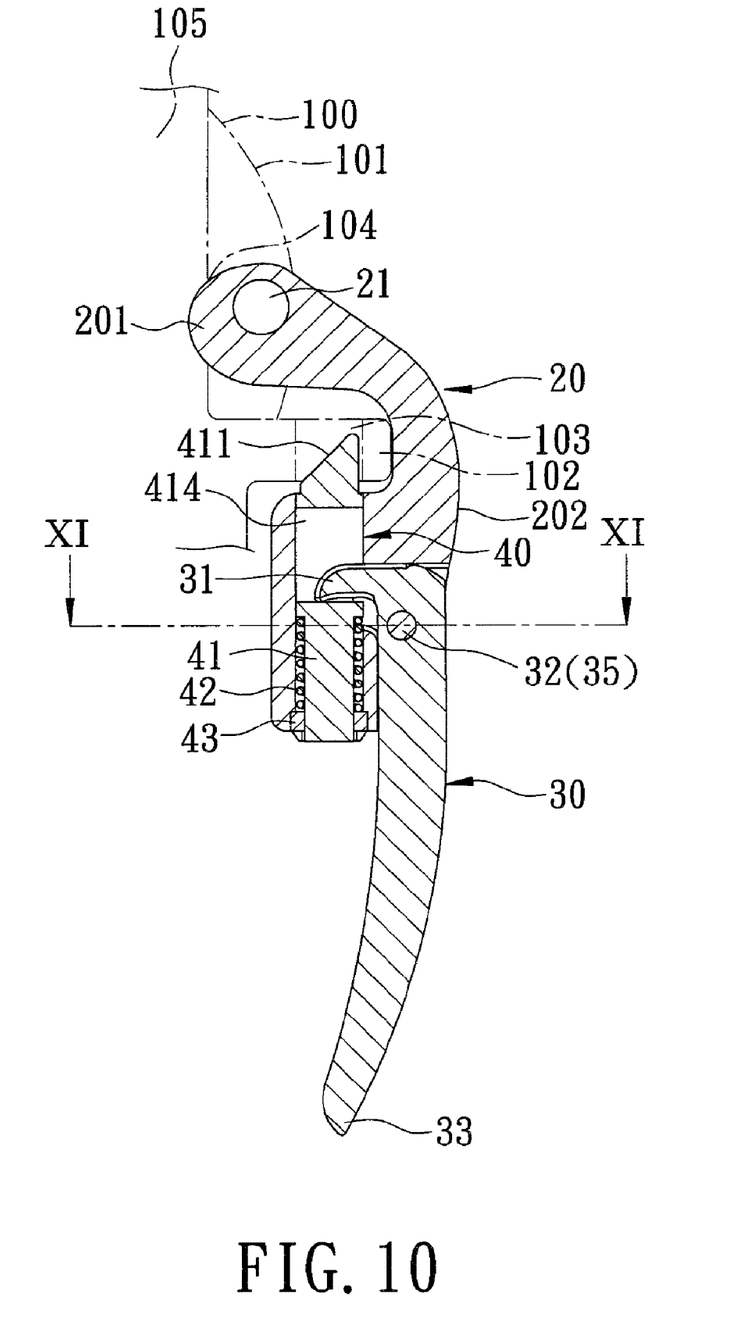
FIG. 10 is a sectional view of the second preferred embodiment.
Figure 11:
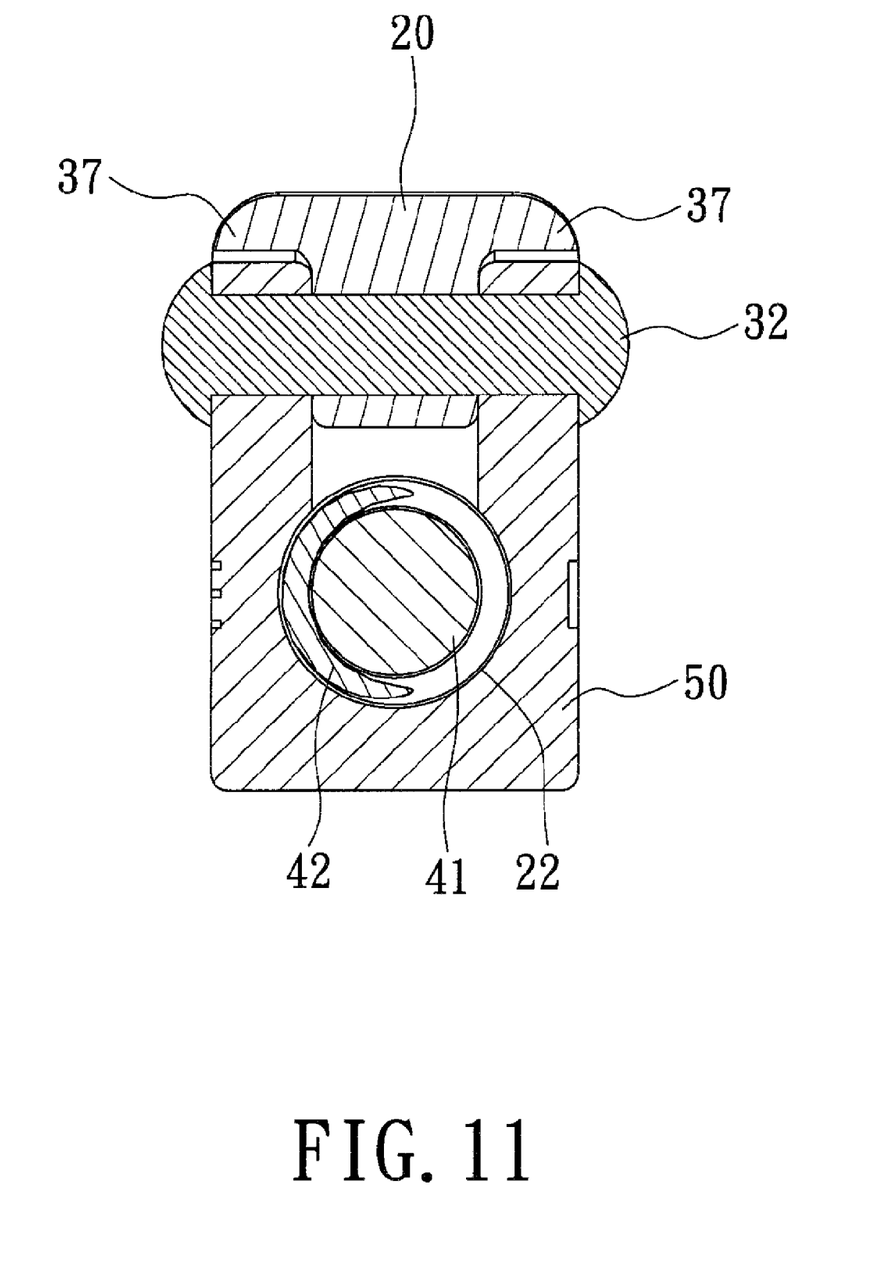
FIG. 11 is a sectional view taken along line XI-XI of FIG. 10.
Figure 12:
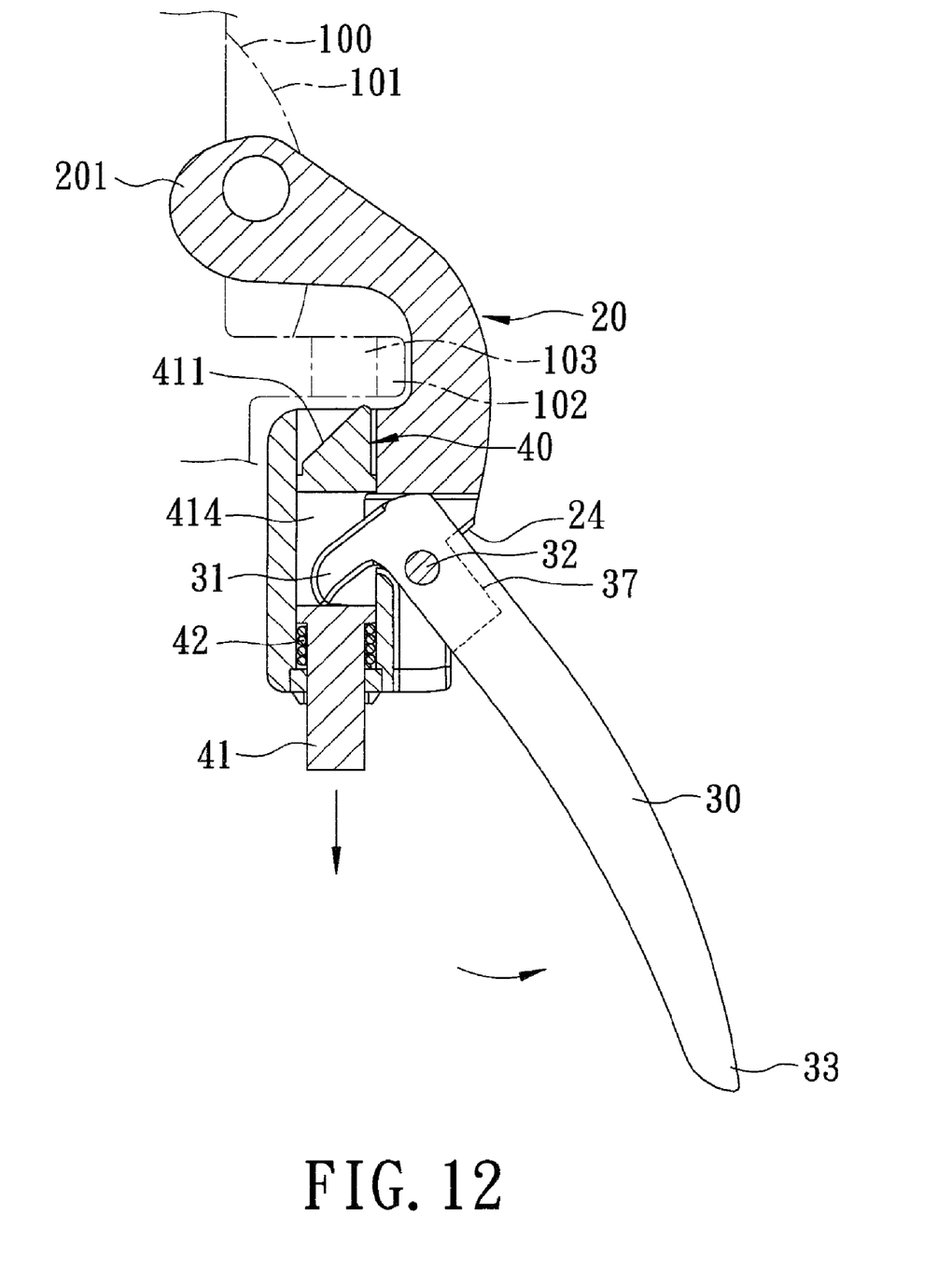
FIG. 12 is a sectional view similar to FIG. 10, illustrating a releasing lever at an unlatched position.
Figure 13:
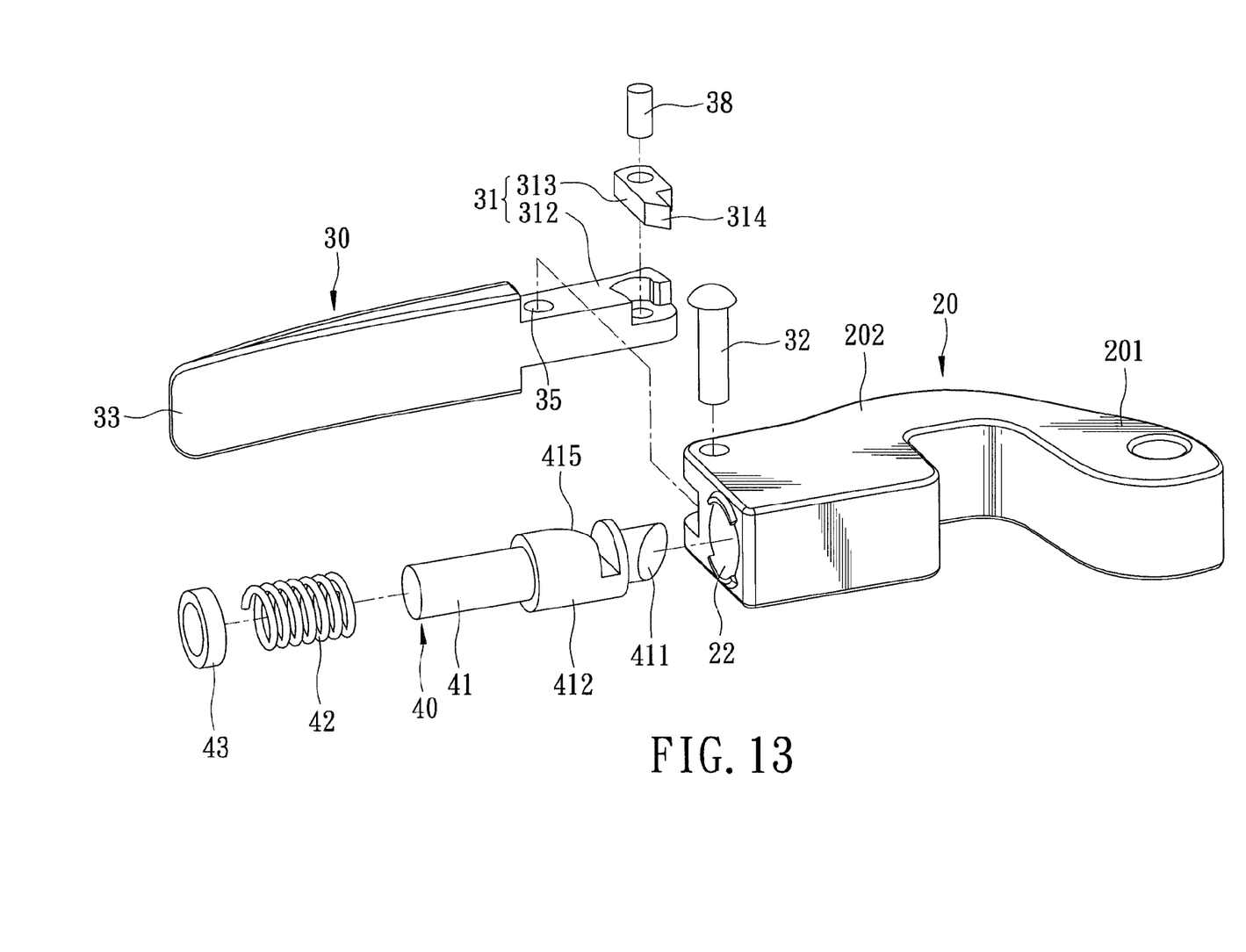
FIG. 13 is an exploded perspective view of the third preferred embodiment of an easily unlatchable cam-lock actuating device according to this invention.
Figure 14:
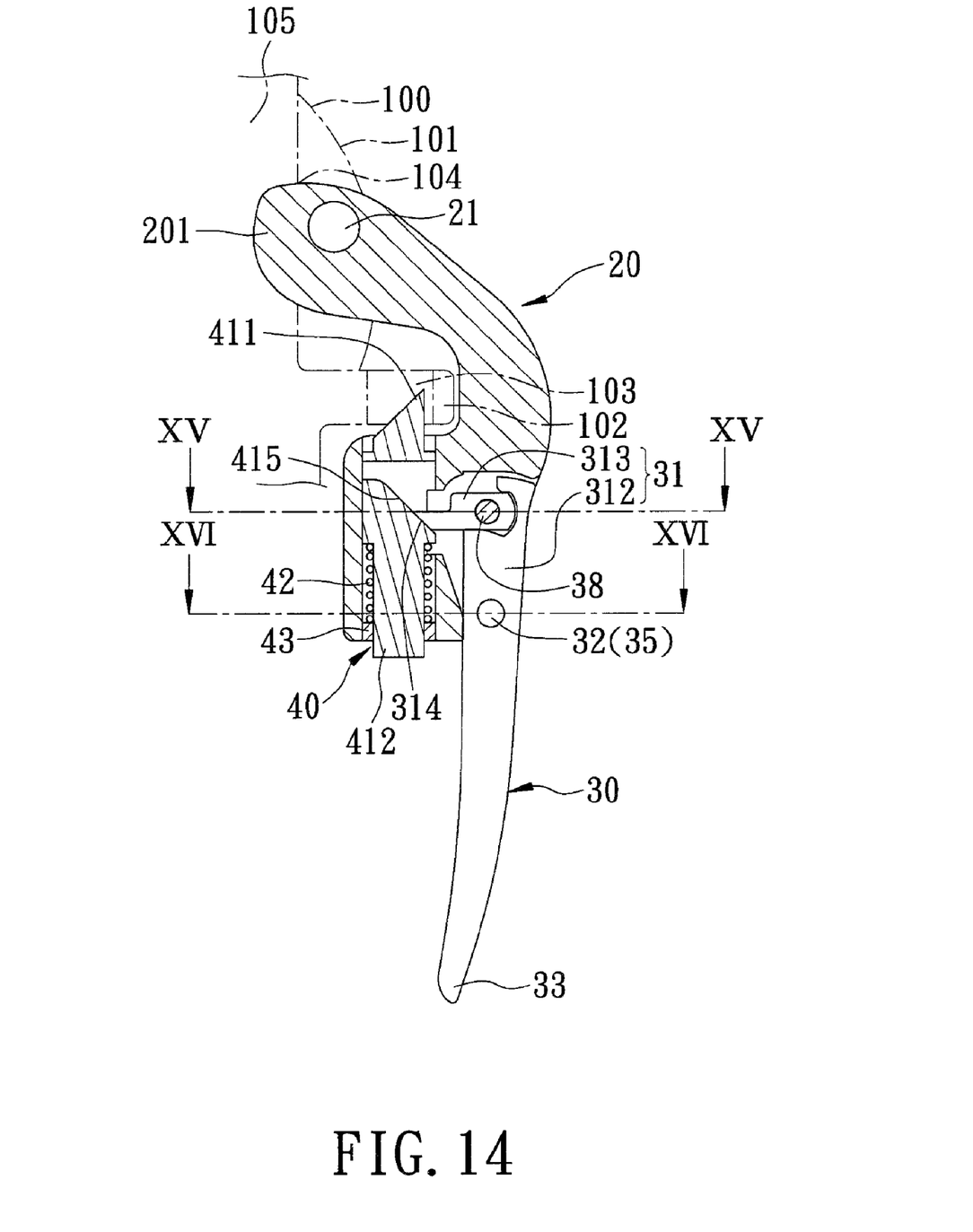
FIG. 14 is a sectional view of the third preferred embodiment.
Figure 15:
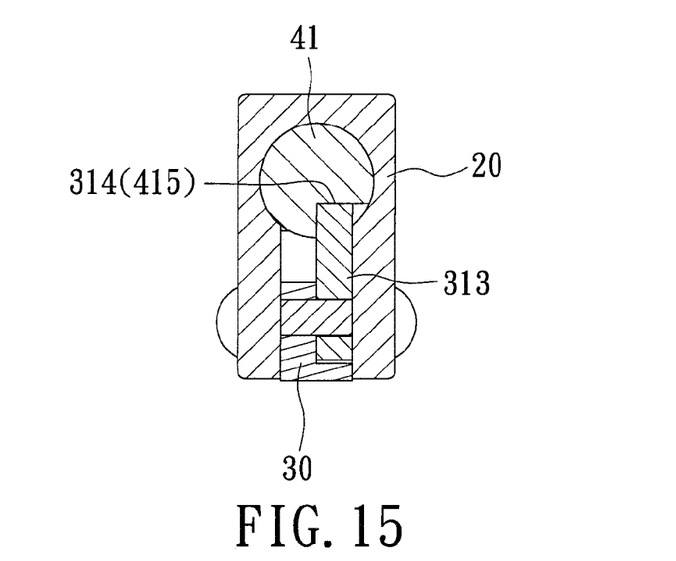
FIG. 15 is a sectional view taken along line XV-XV of FIG. 14.
Figure 16:
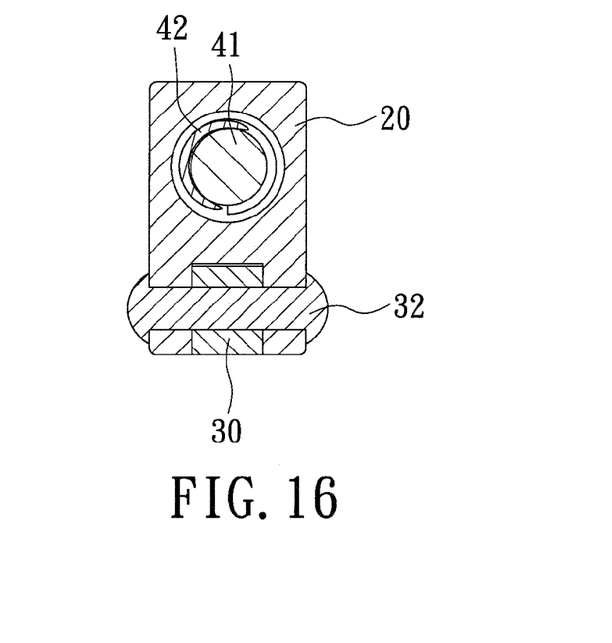
FIG. 16 is a sectional view taken along line XVI-XVI of FIG. 14.

Referring to FIGS. 9 to 11, the second preferred embodiment of an easily unlatchable cam-lock actuating device according to this invention is similar to the previous embodiment in construction. In the second embodiment, the latch shank 41 has a pressed wall 413 which is spaced apart from the latch end 411 along the lengthwise line by a space 414. The weight end 31 of the releasing lever 30 is configured to extend into the space 414 to press the pressed wall 413 so as to permit the latch end 411 to be retracted and to be disengaged from the cavity 103 when the power end 33 is turned to the unlatched position, as shown in FIG. 12. In addition, the counter-force generating mechanism includes a retaining wall 24 which is disposed on the arm body 202 and which is spaced apart from the fulcrum axis 32, and a friction region 37 which is disposed on the releasing lever 30 and which is angularly displaced from the weight end 31 about the fulcrum axis 32 such that, as a result of displacement of the power end 33 to the unlatched position, the friction region 37 is brought into frictional engagement with the retaining wall 24 by a friction force serving as the counter-force so as to retain the power end 33 in the unlatched position.

Figure 17:
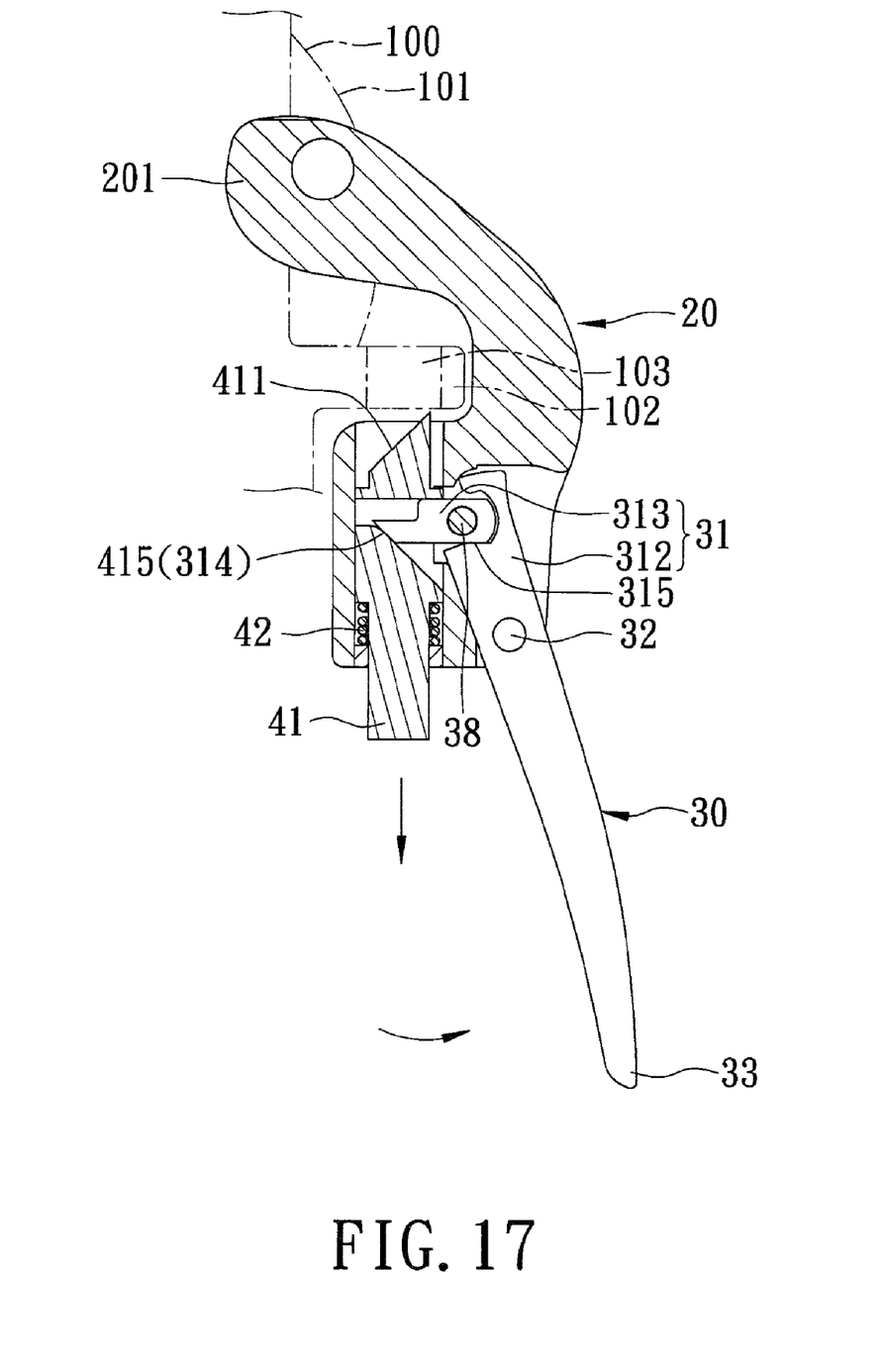
FIG. 17 is a sectional view similar to FIG. 14, illustrating a releasing lever at an unlatched position.

Referring to FIGS. 13 to 16, the third preferred embodiment of an easily unlatchable cam-lock actuating device according to this invention is similar to the previous embodiments in construction. In the third embodiment, the weight end 31 of the releasing lever 30 includes a friction segment 312 extending from the fulcrum portion 35, and a pressing segment 313 which is pivotably mounted on the friction segment 312 by a pivot pin 38 about a turning axis parallel to the fulcrum axis 32, and which has a first cam surface 314. The latch shank 412 has a second cam surface 415 which mates with the first cam surface 314 such that, as shown in FIG. 17, turning of the power end 33 about the fulcrum axis 32 toward the unlatched position results in transverse movement of the pressing segment 313 relative to the lengthwise line to thereby permit the latch end 411 to disengage from the cavity 103. In addition, the counter-force generating mechanism includes a friction wall 315 which is disposed on the friction segment 312 between the turning axis 38 and the fulcrum axis 32 such that, as a result of displacement of the power end 33 to the unlatched position, the friction wall 315 is brought into frictional engagement with the pressing segment 313 by a friction force serving as the counter-force.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. An easily unlatchable cam-lock actuating device for use in a locking coupling assembly that couples two tubular members, the locking coupling assembly including a female tubular coupler which has an inner tubular surface defining a fitting bore for receiving a male tubular end of one of the tubular members, and an outer tubular surface having a radial opening that extends to be communicated with the fitting bore, a lug unit which is disposed on the outer tubular surface adjacent to the radial opening, and a ledge which is disposed on said outer tubular surface and adjacent to the radial opening, and which has a cavity, said cam-lock actuating device comprising:

a cam arm which has a cam-surfaced head that is disposed to extend into the fitting bore, and an arm body that is opposite to said cam-surfaced head, and which is pivotally mounted on the lug unit about a pivot axis such that, when said arm body is turned to a locking position, said cam-surfaced head is moved to depress the male tubular end to thereby lock the male tubular end in the fitting bore;

a spring-loaded latch bolt unit disposed on said arm body, and including a latch bolt which has a latch end and a latch shank that extends from said latch end along a lengthwise line, and which is movable relative to said arm body along the lengthwise line to permit said latch end to engage in the cavity when said arm body is displaced to the locking position, thereby preventing said arm body from moving away from the locking position, and a spring disposed to bias said latch end toward the cavity; and a releasing lever which has weight and power ends opposite to each other, and which is pivotally mounted on said arm body about a fulcrum axis parallel to the pivot axis such that said power end is turnable about the fulcrum axis between a latched position, where said power end is close to the lengthwise line, and an unlatched position, where said power end is remote from the lengthwise line, said weight end being coupled to said latch shank such that, when said power end is turned from the latched position to the unlatched position, said latch end is retracted to disengage from the cavity against the biasing action of said spring.

2. The cam-lock actuating device according to claim 1, further comprising a counter-force generating mechanism disposed to vest said weight end with a counter-force that is generated as a result of displacement of said power end to the unlatched position so as to counteract the biasing action of said spring for retaining said power end at the unlatched position.

3. The cam-lock actuating device according to claim 2, wherein said latch shank has a slotted keyway which extends along the lengthwise line to terminate at proximate and distal regions relative to the cavity, and a docking port which extends transversely from said distal region, said counter-force generating mechanism including a docking shoulder which is formed in said latch shank to define said docking port, and a key which is disposed on said weight end of said releasing lever and which is configured to be slidable in said slotted keyway so as to move from said proximate region to said distal region when said power end is turned from the latched position toward the unlatched position, and to be subsequently anchored on said docking shoulder when said power end reaches the unlatched position.

4. The cam-lock actuating device according to claim 3, wherein said counter-force generating mechanism further includes a joint surface which is disposed on said arm body and which angularly surrounds the fulcrum axis, and a friction wall which is disposed on said releasing lever between the fulcrum axis and said power end, and which is in slidable friction engagement with said joint surface such that, when said power end is displaced to the unlatched position, said friction wall counteracts the biasing action of said spring to guard against disengagement of said key from said docking shoulder.

5. The cam-lock actuating device according to claim 2, wherein said latch shank has a pressed wall which is spaced apart from said latch end along the lengthwise line by a space, said weight end of said releasing lever being configured to extend into said space to press said pressed wall so as to permit said latch end to be retracted to be disengaged from the cavity when said power end is turned to the unlatched position.

6. The cam-lock actuating device according to claim 5, wherein said counter-force generating mechanism includes a retaining wall which is disposed on said arm body and which is spaced apart from the fulcrum axis, and a friction region which is disposed on said releasing lever and which is angularly displaced from said weight end about the fulcrum axis such that, as a result of displacement of said power end to the unlatched position, said friction region is brought into frictional engagement with said retaining wall by a friction force serving as the counter-force.

7. The cam-lock actuating device according to claim 2, wherein said weight end of said releasing lever includes a friction segment and a pressing segment which is pivotally mounted on said friction segment about a turning axis parallel to the fulcrum axis, and which has a first cam surface, said latch shank having a second cam surface which mates with said first cam surface such that turning of said power end about the fulcrum axis toward the unlatched position results in transverse movement of said pressing segment relative to the lengthwise line to thereby permit said latch end to disengage from the cavity.

8. The cam-lock actuating device according to claim 7, wherein said counter-force generating mechanism includes a friction wall which is disposed on said friction segment between said turning axis and said fulcrum axis such that, as a result of displacement of said power end to the unlatched position, said friction wall is brought into frictional engagement with said pressing segment by a friction force serving as the counter-force.

* * * * *